US010648582B2

(12) United States Patent
Imamura

(10) Patent No.: US 10,648,582 B2
(45) Date of Patent: May 12, 2020

(54) CHECK VALVE AND LIQUID DELIVERY PUMP

(71) Applicant: Shimadzu Corporation, Kyoto (JP)

(72) Inventor: Shinya Imamura, Ibaraki (JP)

(73) Assignee: Shimadzu Corporation, Nishinokyo-Kuwabaracho, Nakagyo-ku, Kyoto-shi, Kyoto (JP)

( * ) Notice: Subject to any disclaimer, the term of this patent is extended or adjusted under 35 U.S.C. 154(b) by 238 days.

(21) Appl. No.: 15/737,765

(22) PCT Filed: Sep. 15, 2015

(86) PCT No.: PCT/JP2015/076080
§ 371 (c)(1),
(2) Date: Dec. 19, 2017

(87) PCT Pub. No.: WO2017/046861
PCT Pub. Date: Mar. 23, 2017

(65) Prior Publication Data
US 2018/0313454 A1    Nov. 1, 2018

(51) Int. Cl.
*F16K 15/18* (2006.01)
*F04B 19/22* (2006.01)
(Continued)

(52) U.S. Cl.
CPC ............ *F16K 15/18* (2013.01); *F04B 7/0076* (2013.01); *F04B 19/22* (2013.01);
(Continued)

(58) Field of Classification Search
CPC .... F16K 15/18; F16K 31/082; F04B 53/1087; F04B 19/22
(Continued)

(56) References Cited

U.S. PATENT DOCUMENTS 4,169,695 A * 10/1979 Masuda ............... F02M 37/043
417/311
4,911,405 A    3/1990 Weissgerber
(Continued)

FOREIGN PATENT DOCUMENTS

CN    101720400 A    6/2010
CN    202597801 U    12/2012
(Continued)

OTHER PUBLICATIONS

International Search Report dated Dec. 22, 2015 of PCT/JP2015/076080.
(Continued)

*Primary Examiner* — Kevin L Lee
(74) *Attorney, Agent, or Firm* — Muir Patent Law, PLLC

(57) ABSTRACT

A check valve is provided with a rectilinear flow passage having a liquid inlet and a liquid outlet and allowing a liquid to flow therethrough in one direction, and a first valve body, a first valve seat, a second valve body, and a second valve seat are provided in the rectilinear flow passage. A first drive body is provided in the rectilinear flow passage at a position closer to the liquid inlet than the first valve body so as to be movable in one direction. The first drive body is driven in one direction by the drive mechanism. The drive mechanism is adapted to set the first drive body either to an open state in which the first drive body presses the first valve body toward the liquid outlet side to detach the first valve body from the first valve seat or to a closure state in which the first drive body does not press the first valve body toward the liquid outlet but allows the first valve body to be seated on the first valve seat. A second drive body is provided in the rectilinear flow passage at a position between the first valve body and the second valve body so as to be movable in one direction. When the first drive is set to the open state, the second drive body is pressed by the first valve body toward
(Continued)

the liquid outlet to press the second valve body toward the liquid outlet, thereby detaching the second valve body from the second valve seat, and when the first drive body is set to the closure state, the second drive body is moved away from the second valve body to allow the second valve body to be seated on the second valve seat.

8 Claims, 4 Drawing Sheets

(51) Int. Cl.
    *F16K 31/08*     (2006.01)
    *F04B 53/10*     (2006.01)
    *F04B 7/00*     (2006.01)

(52) U.S. Cl.
    CPC ...... *F04B 53/1002* (2013.01); *F04B 53/1087* (2013.01); *F16K 15/183* (2013.01); *F16K 31/082* (2013.01)

(58) Field of Classification Search
    USPC ...................................... 251/129.14; 137/512
    See application file for complete search history.

(56) References Cited

U.S. PATENT DOCUMENTS

| | | | | |
|---|---|---|---|---|
| 4,945,945 | A | * | 8/1990 | Schmid .................. F16K 15/04 137/512 |
| 5,002,662 | A | * | 3/1991 | Ledtje et al. ......... F16K 15/042 137/512 |
| 6,007,314 | A | | 12/1999 | Nelson, II |
| 8,528,592 | B2 | * | 9/2013 | Dong .................. F04B 53/1002 137/512 |
| 10,428,942 | B2 | * | 10/2019 | Homing et al. ........ F04B 53/14 |

FOREIGN PATENT DOCUMENTS

| | | |
|---|---|---|
| CN | 103038552 B | 6/2014 |
| CN | 103109088 B | 9/2015 |
| DE | 461013 C | 6/1928 |
| JP | 1989-247878 A | 3/1989 |
| JP | 1997-292381 A | 11/1997 |
| JP | 2001-235052 A | 8/2001 |
| JP | 2006-250835 A | 9/2006 |

OTHER PUBLICATIONS

First Office Action from the Chinese Patent Office dated Oct. 8, 2018, in corresponding application No. CN-201580081153.6.

* cited by examiner

CHECK VALVE AND LIQUID DELIVERY PUMP

TECHNICAL FIELD

The present invention relates to a check valve for preventing a backward flow of a liquid and a liquid delivery pump for sucking and discharging a liquid by reciprocating a plunger in one direction.

BACKGROUND ART

A liquid delivery pump configured to deliver a liquid by reciprocating a plunger in one direction is provided with a check valve for preventing a backward flow of a liquid at an inlet or an outlet of a pump chamber. A typical check valve includes a spherical valve body arranged so as to be movable in a flow direction of a liquid and a valve seat for seating the valve body. The valve seat is a hollow cylindrical member allowing a liquid to pass through the inside thereof. When the spherical valve body is seated on the edge of the opening of the valve seat, the flow passage of the liquid is closed.

In the check valve positioned on the inlet side of the pump chamber, when the plunger is driven in the direction in which the plunger is pushed into the pump chamber (hereinafter referred to as "discharge direction"), the inside of the pump chamber becomes positive in pressure (a state higher in pressure than the atmospheric pressure). As a result, the valve body is moved toward the valve seat by the pressure of the pump chamber and seated on the valve seat. To the contrary, when the plunger is driven in the direction in which the plunger is pulled out from the pump chamber (hereinafter referred to as "suction direction"), the inside of the pump chamber becomes negative in pressure (a state lower in pressure than the atmospheric pressure). As a result, the valve body is pulled toward the pump chamber by the negative pressure and detached from the valve seat. The check valve positioned on the outlet side of the pump chamber is operated in the opposite way.

As mentioned above, in the check valve in which the valve body is passively operated by the pressure in the pump chamber, when the valve body and the valve seat are stuck with each other by the adhesion of dart, etc., to the valve body surface or the contact surface between the valve body and the valve seat, the check valve positioned on the inlet side would be no longer opened only by the negative pressure generated in the pump head at the time of the pump suction, which may sometimes result in poor liquid delivery.

For this reason, it has been proposed to actively operate the valve body by using a solenoid or the like (see Patent Document 1). By actively operating the valve body, even when the valve body and the valve seat are stuck with each other, the valve body can reliably be detached from the valve seat, so that the valve can be opened.

PRIOR ART

Patent Document
Patent Document 1: Japanese Unexamined Patent Application Publication No. 2001-235052

SUMMARY OF THE INVENTION

Problems to be Solved by the Invention

Even if the valve body is actively operated as described above, such a problem that the valve body does not normally seat on the valve seat due to the presence of, e.g., air bubbles or foreign matters and therefore the valve would not be completely closed may occur.

Therefore, the present invention aims to further improve reliability of an opening and closing operation of a valve in a check valve.

Means for Solving the Problems

An embodiment of a check valve according to the present invention is provided with a rectilinear flow passage having a liquid inlet and a liquid outlet and configured to flow a liquid in one direction, and a first valve body, a first valve seat, a second valve body, and a second valve seat are provided in the rectilinear flow passage. The first valve seat is provided in the rectilinear flow passage so as to be movable in one direction. The first valve seat is arranged on a side of the liquid inlet than the first valve body, has a flow passage forming a part of the rectilinear flow passage on an inner side, and is configured to seat the first valve body so as to close a liquid outlet side opening of the flow passage. The second valve body is provided in the rectilinear flow passage so as to be movable in the one direction on a side of the liquid outlet than the first valve body. The second valve seat is arranged on a side of the liquid outlet than the first valve body and on a side of the liquid inlet than the second valve body, has a flow passage forming a part of the rectilinear flow passage on an inner side, and is configured to seat the second valve body so as to close a liquid outlet side opening of the flow passage.

A first drive body is provided in the rectilinear flow passage at a position closer to the liquid inlet than the first valve body so as to be movable in one direction. The first drive body is driven in one direction by a drive mechanism. The drive mechanism is adapted to set the first drive body either to an open state in which the first drive body presses the first valve body toward the liquid outlet to detach the first valve body from the first valve seat or to a closure state in which the first drive body does not press the first valve body toward the liquid outlet but allows the first valve body to be seated on the first valve seat. Further, a second drive body is provided in the rectilinear flow passage at a position between the first valve body and the second valve body so as to be movable in one direction. When the first drive body is set to the open state, the second drive body is pressed by the first valve body toward the liquid outlet to press the second valve body toward the liquid outlet, thereby detaching the second valve body from the second valve seat, and when the first drive body is set to the closure state, the second drive body is moved away from the second valve body to allow the second valve body to be seated on the second valve seat.

One embodiment of the liquid delivery pump according to the present invention is provided with a pump chamber, a liquid inlet flow passage that allows a liquid to flow into the pump chamber, a liquid outlet flow passage that allows a liquid to flow out of the pump chamber, a plunger having a tip end inserted in the pump chamber, a plunger drive mechanism configured to drive the plunger in its axial direction, an inlet side check valve provided in the liquid inlet flow passage to prevent a backward flow of a liquid in the liquid inlet flow passage when a liquid is discharged from the pump chamber, and an outlet side check valve provided in the liquid outlet flow passage to prevent a backward flow of a liquid in the liquid outlet flow passage when a liquid is sucked into the pump chamber, wherein at least one of the inlet side check valve and the outlet side check valve is composed of the aforementioned check valve.

Effects of the Invention

In one embodiment of the check valve according to the present invention, since as the valve opening and closing mechanism, it is composed of a set of the first valve body and the first valve seat and a set of the second valve body and the second valve seat, even in cases where one of the opening and closing mechanisms becomes unable to close due to air bubbles or the like, the valve can be closed by the other opening and closing mechanism. With this, the reliability when closing the check valve can be improved.

On the other hand, if two sets of valve opening and closing mechanisms are provided, although the reliability when closing the valve improves, there is a concern that the risk of occurrence of a problem that the valve does not open due to the adherence between the valve body and the valve seat at the time of opening the valve is doubled. However, in this embodiment, the first valve body can be actively detached from the first valve seat by the first drive body and the drive mechanism and the second valve body can be actively detached from the second valve seat by the second drive body. Therefore, even when the first valve body and the first valve seat are adhered with each other, or even when the second valve body and the second valve seat are adhered with each other, the valve can be reliably opened. Therefore, by providing two pairs of valve opening and closing mechanisms, it is possible to reliably open the valve while improving the reliability of closing the valve, and it is possible to enhance the reliability of the valve opening and closing operation in the check valve.

In one embodiment of the liquid delivery pump according to the invention, since at least one of the inlet side check valve and the outlet side check valve is composed of the aforementioned check valve, the reliability of the opening and closing operation of the check valve can be improved, which in turn can improve the liquid delivery accuracy.

EMBODIMENTS FOR CARRYING OUT THE INVENTION

An example of a second drive body is a pin that is shorter than a distance between a first valve body seated on a first valve seat and a second valve body seated on a second valve seat.

In the above case, it is preferable that the second drive body be supported by the second valve seat so as to maintain a state in which its axial direction extends in one direction. In this case, the inclination of the second drive body when the second drive body is moved in one direction is prevented. As a result, it is prevented that a part of the second drive body locally comes into contact with the inner peripheral surface of the second valve seat so that the second drive body and the second valve seat are easily worn.

As a structure for maintaining the second drive body so as to extend in one direction, it can be exemplified that the inner flow passage of the second valve seat has a circular cross-section in a direction perpendicular to its flow direction and that the cross-sectional shape of the second drive body has a shape in which a part of a circular shape having an outer diameter approximately the same as the inner diameter of the inner flow passage of the second valve seat is missing in a direction perpendicular to the axial direction.

Also, when the second drive body and the second valve seat are composed of different materials, a member made of a softer material is likely to be worn out when the second drive body slides on the inner peripheral surface of the second valve seat. For this reason, it is preferable that the second drive body be composed of the same material as the second valve seat. In this case, both the second drive body and the second valve seat become less likely to wear.

It may be configured such that the first valve body and the second valve body are composed of members of the same shape and made of the same material and that the first valve seat and the second valve seat are composed of members of the same shape and made of the same material. In this case, the first valve body and the second valve body may be composed of the same member and the first valve seat and the second valve seat may also be composed of the same member. With this, the manufacturing cost can be reduced.

It is also preferable to provide a pressing member for pressing the second valve body from the liquid outlet side toward the liquid inlet. With this, when closing the valve, it is possible to actively seat the second valve body on the second valve seat, which can prevent the occurrence of trouble when closing the valve.

Hereinafter, an embodiment of a check valve and a liquid delivery pump according to the present invention will be described with reference to the drawings.

Figure 1:
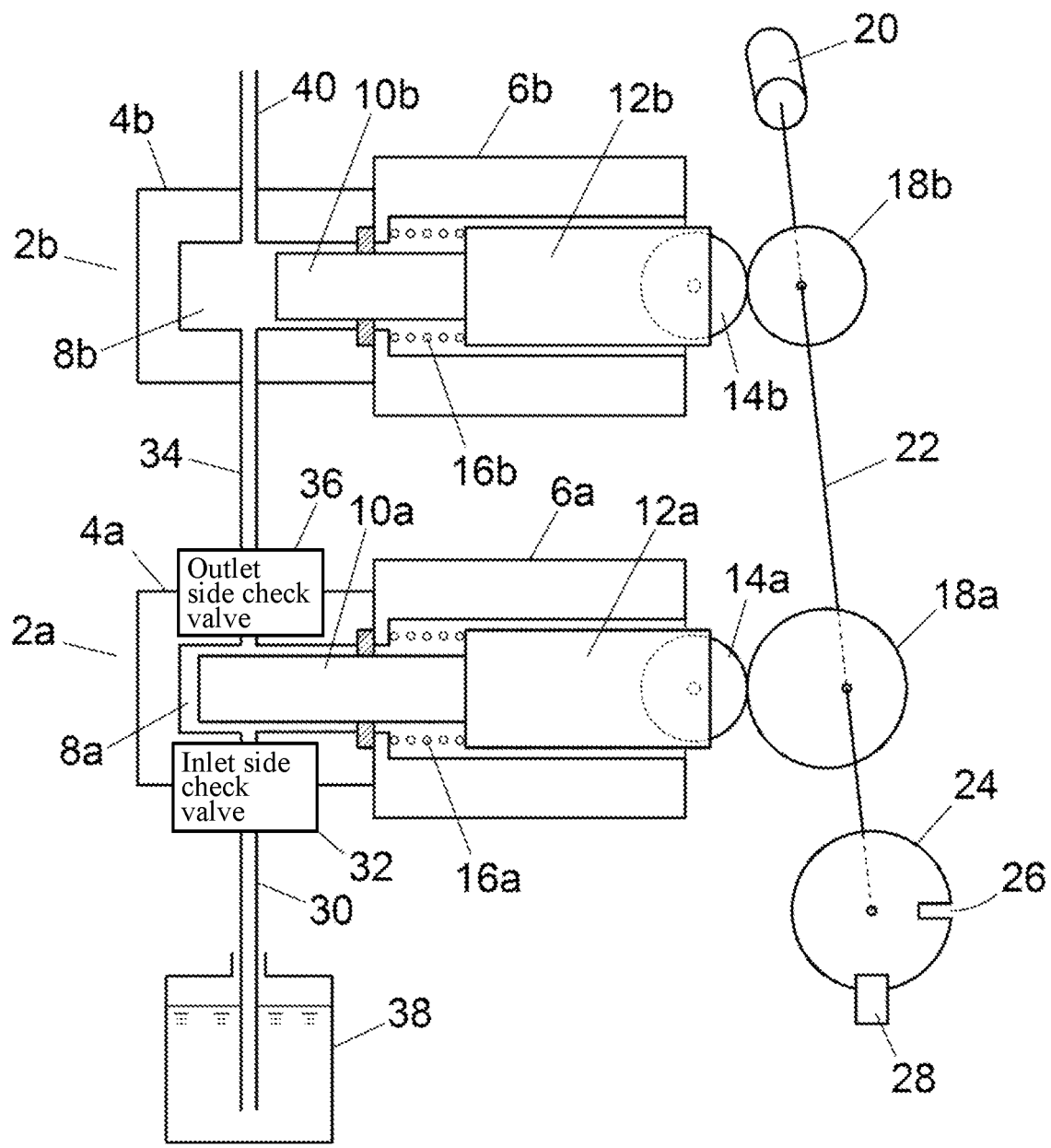
FIG. 1 is a schematic configuration diagram showing one embodiment of a liquid delivery pump.

FIG. 1 is a schematic configuration diagram showing one embodiment of a liquid delivery device including a liquid delivery pump according to the present invention to which a check valve according to the present invention is applied.

The liquid delivery pump of this embodiment is equipped with a liquid delivery pump according to the present invention as a liquid delivery pump 2a on the primary side. A liquid delivery pump 2b on the secondary side is connected to the liquid delivery pump 2a in series via a flow passage 34. The liquid delivery pumps 2a and 2b perform suction and discharge of a liquid at different timings to deliver a liquid at a constant flow rate.

The liquid delivery pump 2a is equipped with a pump head 4a and a pump body 6a, and the liquid delivery pump 2b is equipped with a pump head 4b and a pump body 6b. The pump heads 4a and 4b have respective pump chambers 8a and 8b inside thereof, and the tip ends of plungers 10a and 10b are inserted into the respective pump chambers 8a and 8b. The base end of the plunger 10a is held by a crosshead 12a, and the base end of the plunger 10b is held by a crosshead 12b. The crosshead 12a is accommodated in the pump body 6a so as to be movable in the axial direction of the plunger 10a (in the left and right direction in the drawing), and the crosshead 12b is accommodated in the pump body 6b so as to be movable in the axial direction of the plunger 10b (in the left and right direction in the drawing, hereinafter referred to as "one direction").

The crosshead 12a is urged by an elastic member 16a in a direction opposite to the pump head 4a, and is provided with a cam follower 14a at an end opposite to the pump head 4a. The cam follower 14a is in contact with the circumferential surface of an eccentric cam 18a. The crosshead 12b is urged by an elastic member 16b in a direction opposite to the pump head 4b, and is provided with a cam follower 14b at an end opposite to the pump head 4b. The cam follower 14b is in contact with the circumferential surface of an eccentric cam 18b. The elastic members 16a and 16b are, for example, coil springs.

The cams 18a and 18b are attached to a drive shaft 22 which is rotated by a stepping motor 20 and rotated together with the drive shaft 22. Since the crosshead 12a is urged toward the side opposite to the pump head 4a by the elastic member 16a, when the cam 18a rotates, the crosshead 12a is moved in one direction so that the cam follower 14a follows the circumferential surface of the cam 18a. As a result, the plunger 10a reciprocates in one direction. In the same manner, since the crosshead 12b is urged toward the side opposite to the pump head 4b by the elastic member 16b, when the cam 18b rotates, the crosshead 12b is moved in one direction so that the cam follower 14b follows the circumferential surface of the cam 18b. As a result, the plunger 10b reciprocates in one direction. The crosshead 12a, the cam follower 14a, the elastic member 16a, the cam 18a, the stepping motor 20, and the drive shaft 22 constitute a plunger drive mechanism for driving the plunger 10a in the axial direction.

The drive shaft 22 is also equipped with an origin detection disk 24 having a slit 26 on a part of its circumference, and the origin detection disk 24 rotates in accordance with the rotation of the stepping motor 20. In the vicinity of the origin detection disk 24, an origin detection photo-interrupter 28 for detecting the slit 26 is provided.

A flow passage 30 (liquid inlet flow passage) is connected to the liquid inlet of the pump head 4a via an inlet side check valve 32. The flow passage 30 is communicated with the container 38 for storing a liquid. One end of the flow passage 34 (liquid outlet flow passage) is connected to the liquid outlet of the pump head 4a via an outlet side check valve 36. The other end of the flow passage 34 is connected to the liquid inlet of the pump head 4b. A flow passage 40 is connected to the liquid outlet of the pump head 4b.

The inlet side check valve 32 is configured to prevent the backward flow of a liquid in the flow passage 30 when a liquid is discharged from the pump head 4a. The outlet side check valve 36 is configured to prevent the backward flow of a liquid in the flow passage 34 when a liquid is sucked into the pump head 4b. The inlet side check valve 32 opens when the plunger 10a is driven in the direction that the pump chamber 8a is pulled from the pump chamber 8a (the right direction in the drawing, hereinafter referred to as "suction direction") and closes when the plunger 10a is pushed into the pump chamber 8a (the left direction in the drawing, hereinafter referred to as "discharge direction"). To the contrary, the outlet side check valve 32 closes when the plunger 10a is driven in the suction direction, and opens when the plunger 10b is driven in the discharge direction. The structure of the inlet side check valve 32 and that of the outlet side check valve 36 will be described later.

When the plunger 10a is driven in the discharge direction, the plunger 10b is driven in the suction direction, so that the inlet side check valve 32 is closed and the outlet side check valve 36 is opened. As a result, the liquid in the pump chamber 8a is discharged toward the pump chamber 8b through the flow passage 34, and the liquid is delivered through the flow passage 40 while the pump chamber 8b is being filled with a liquid. At this time, the flow rate obtained by subtracting the suction flow rate of the liquid delivery pump 2b from the discharge flow rate of the liquid delivery pump 2a is a liquid delivery flow rate of the liquid delivery pump.

To the contrary, when the plunger 10a is driven in the suction direction, the plunger 10b is driven in the discharge direction, so that the inlet side check valve 32 is opened and the outlet side check valve 36 is closed. As a result, a liquid is sucked into the pump chamber 8a through the flow passage 30, and at the same time, a liquid is sent from the pump chamber 8b through the flow passage 40. At this time, the discharge flow rate of the liquid delivery pump 2b becomes the liquid delivery flow rate of the liquid delivery pump.

The plunger capacity of the pump head 4a is about twice the capacity of the plunger of the pump head 4b, and the plungers 10a and 10b are driven with the phase shifted by 180 degrees, so that the delivery flow rate in the flow passage 40 is maintained constant.

Figure 2:
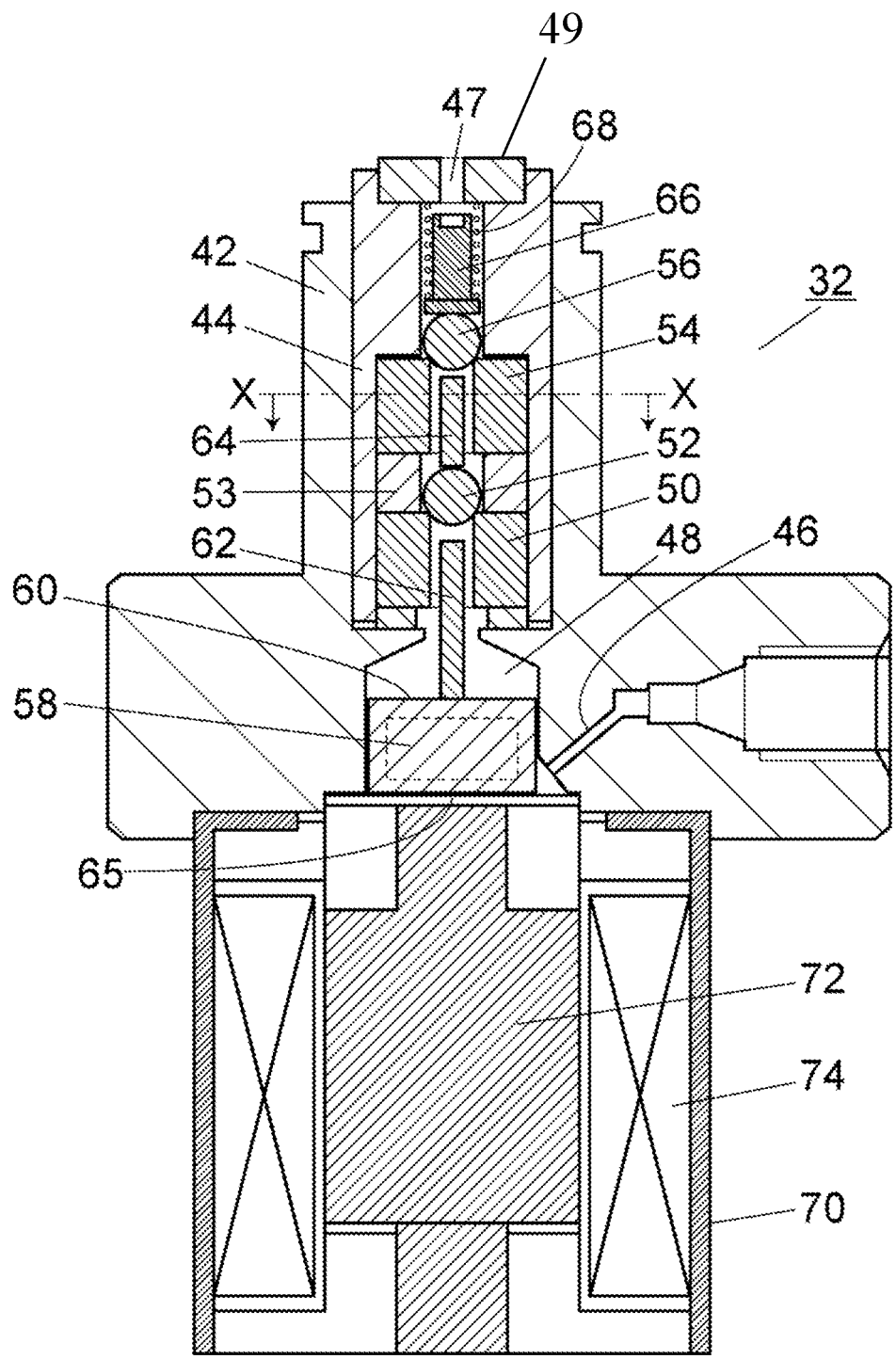
FIG. 2 is a cross-sectional view showing a structure of a check valve applied to the embodiment.

Next, the structure of the inlet side check valve 32 and that of the outlet side check valve 36 will be described with reference to FIG. 2. In this embodiment, since the outlet side check valve 36 has the same structure as the inlet side check valve 32, only the inlet side check valve 32 will be described here.

The inlet side check valve 32 is provided with a T-shaped valve body 42 having a protrusion protruding upward and a drive mechanism 70 attached to the lower surface of the valve body 42. The valve body 42 includes a cavity therein, and a liquid inlet 46 for allowing a liquid to flow from the side surface into the cavity is provided, and a liquid outlet 47 for flowing out a liquid is provided on the upper end face.

A cylindrical housing 44 is inserted from the tip end side of the convex portion of the valve body 42. In the housing 44, a straight flow passage (rectilinear flow passage) configured to flow the liquid flowed in from the liquid inlet 46 of the valve body 42 in one direction toward the liquid outlet 47 is formed. A ring-shaped gasket 49 is attached to the upper end face of the housing 44, and a through-hole formed in the gasket 49 serves as a liquid outlet 47 that allows a liquid to flow out.

In the cavity in the housing 44, a ball seat 50 (first valve seat), a ball 52 (first valve body), a ball seat 54 (second valve seat), and a ball 56 (second valve body) are accommodated side by side in the axial direction (vertical direction) of the housing 44 from the lower side. The ball seats 50 and 54 are cylindrical members constituting a part of the rectilinear flow passage in the housing 44. The ball seat 50 and 54 are fixed in position and configured to seat the balls 52 and 56 on the respective upper opening portions. The pair of the ball seat 50 and the ball 52 and the pair of the ball seat 54 and the ball 56 each constitute an opening and closing mechanism for opening and closing the valve.

A spacer 53 is arranged between the ball seats 50 and 54. The spacer 53 has an inner diameter slightly larger than the outer diameter of the ball 52. The ball 52 is arranged so as to be movable in the axial direction of the housing 44 in the spacer 53. The ball 56 is also arranged above the ball seat 54 so as to be movable in the axial direction of the housing 44. As the first valve body and the second valve body, members of other shapes, such as, e.g., conical plugs, may be used in place of the balls 52 and 56. The ball seat 50 and the ball seat 54 are composed of the same member, and the ball 52 and the ball 56 are composed of the same member.

The valve body 42 is provided with a cylinder section 48 at a position directly below the housing 44. The cylinder section 48 is a space for moving the operating portion 60 in which a permanent magnet 58 is embedded in the axial direction (vertical direction) of the housing 44. An operating portion 60 is accommodated in the cylinder section 48 so as to be movable in the vertical direction. The operating portion 60 holds the base end of a pin 62 (first drive body). The pin 62 is arranged in the vertical direction so as to extend toward the ball 52. In the state in which the ball 52 is seated on the ball seat 50, there is a gap of, for example, about 0.4 mm between the pin 62 and the ball 52. A sheet 65 made of, for example, PTFE (polytetrafluoroethylene) or the like is provided as a bottom surface of the cylinder section 48. The operating portion 60 is supported by the seat 65.

A pin 64 (second drive body) is arranged between the balls 52 and 56 in the vertical direction along the axial direction of the housing 44. The pin 64 is provided so as to be movable in the vertical direction inside the ball seat 54. The length of the pin 64 is shorter than the gap between the ball 52 and the ball 56, and in a state in which the ball 52 is seated on the ball seat 50 and the ball 56 is seated on the ball seat 54, there is a gap of, for example, about 0.3 mm between the pin 64 and the ball 56.

Figure 3:
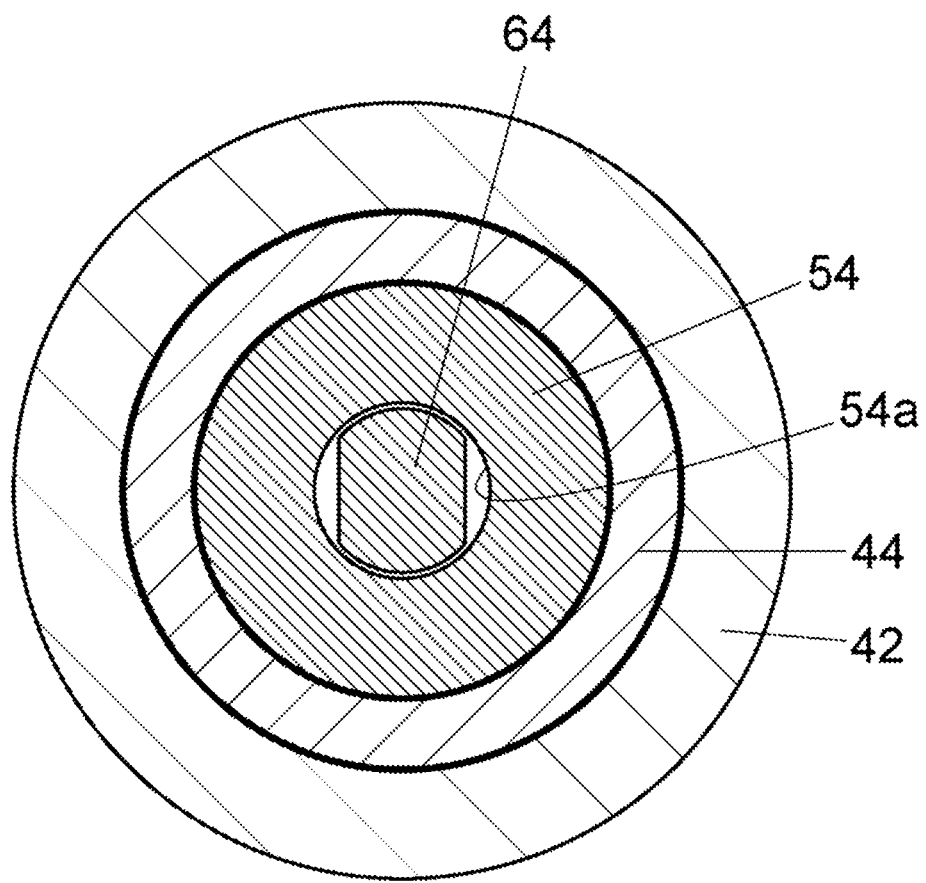
FIG. 3 is a cross-sectional view taken along the line X-X in FIG. 2.

As shown in FIG. 3, the cross-sectional shape of the pin 64 is formed in a shape in which a part of a circular shape having substantially the same outer diameter as the inner diameter of the ball seat 54 is missing. With this, when the pin 64 is moved in the vertical direction in the ball seat 54, the axis of the pin 64 does not tilt from the vertical direction, and it is prevented that the inner peripheral surface of the ball seat 54 comes locally into contact with the pin 64 and wears.

Further, the pin 64 is composed of the same material (for example sapphire) as the ball seat 54. The pin 64 slides on the inner peripheral surface of the ball seat 54, but due to the same material, one of them is prevented from being significantly worn.

A weight 66 is arranged between the gasket 49 attached to the upper end of the housing 44 and the ball 56. The weight 66 is urged in the vertically downward direction by an elastic member 68 composed of, for example, a coil spring. As a result, the ball 56 is constantly pressed toward the ball seat 54. The weight 66 and the elastic member 68 serve as a pressing member for pressing the ball 56 (second valve body) toward the ball seat 54 (second valve seat).

The drive mechanism 70 is equipped with an iron core 72 provided at a position directly under the seat 65 supporting the operating portion 60 and a coil 74 arranged at a distance from the side surface of the iron core 72. When a current flows through the coil 74, a magnetic field passing through the operating portion 60 is generated, so that the operating portion 60 is raised upward from the seat 65 by, for example, 0.9 mm.

Figure 4:
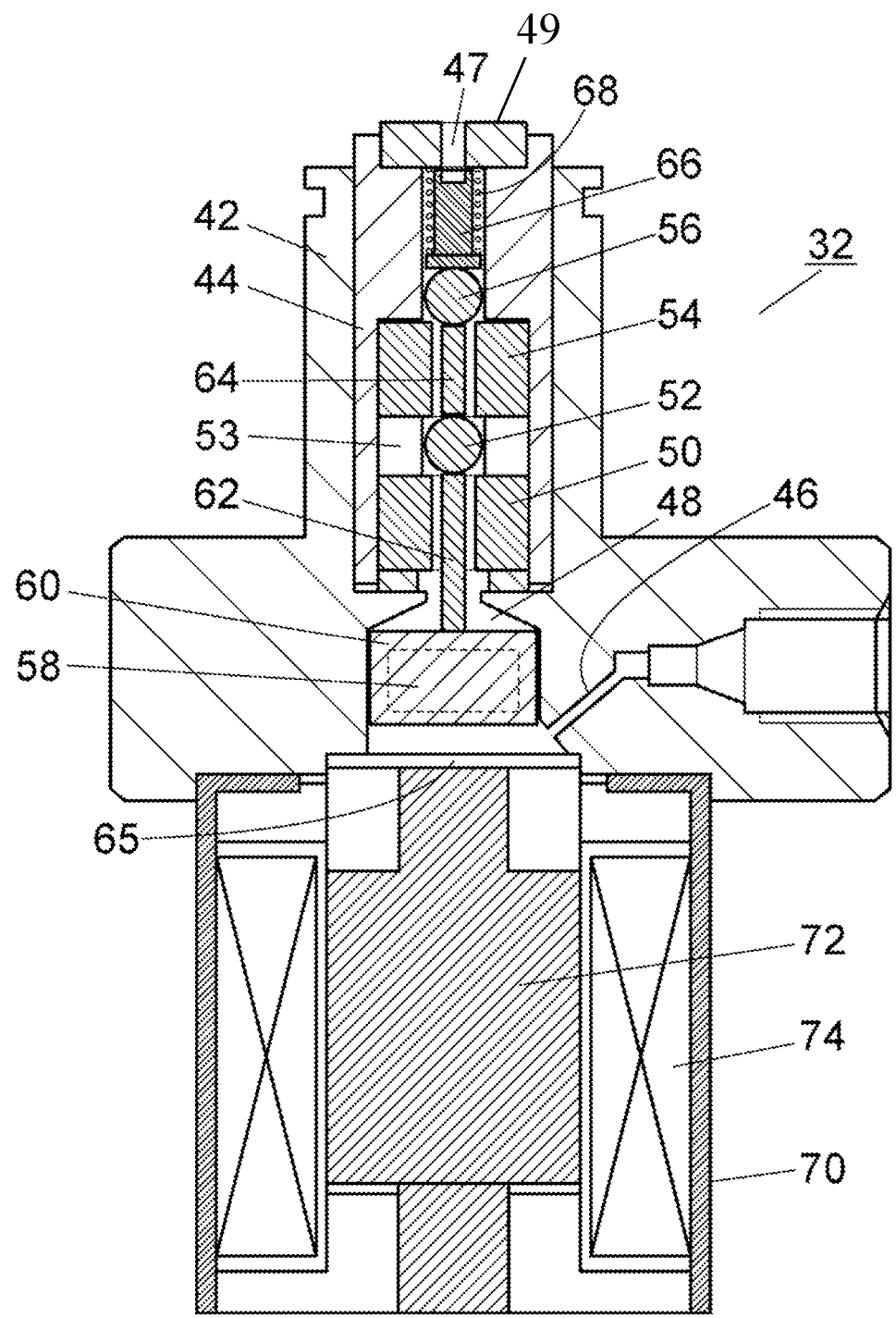
FIG. 4 is a cross-sectional view showing a state in which the check valve of the embodiment is opened.

When the operating portion 60 is raised upward, as shown in FIG. 4, the pin 62 presses the ball 52 upward and the ball 52 is raised by 0.5 mm from the ball seat 50. When the ball 52 is raised from the ball seat 50, the pin 64 is raised upward and accordingly pushes the ball 56 upward. As a result, the ball 56 is raised by 0.2 mm from the state in which it is seated on the ball seat 54. With this, the inlet side check valve 32 becomes in an opened state. The state of the pin 62 at this time is referred to as "open state".

When opening the inlet side check valve 32, by generating a magnetic field in a direction repelling the permanent magnet 58 so that the operating portion 60 moves upward by the drive mechanism 70, the pin 62 is made in an open state. This moves the ball 52 upward by the pin 62, which in turn pushes the ball 56 upward by the pin 64. Therefore, since the balls 52 and 56 are actively pushed upward by the pins 62 and 64, respectively, there is no trouble that the valve wouldn't open due to adhesion between the ball seat 50 and the ball 52 and adhesion between the ball seat 54 and the ball 56. As a result, the valve can be opened assuredly.

To the contrary, when closing the valve, by not generating a magnetic field by the drive mechanism 70, the operating portion 60 descends to the seat 65 by its own weight. When the operating portion 60 descends, the ball 52 descends due to its own weight and the load of the pin 64 and is seated on the ball seat 50. The ball 56 is seated on the ball seat 54 by pressurizing the inside of the pump chamber 8a and by the downward pressing by the weight 66. The state of the pin 64 at this time is referred to as "closure state".

In cases where the opening and closing mechanism of the valve has two stages, when one of the two opening and closing mechanisms is normally closed at the time of closing the valve, the function as the check valve is fulfilled, so there is an advantage that the reliability at the time of closing the valve can be improved. On the other hand, at the time of opening the valve, if one of the two opening and closing mechanisms does not normally open, it does not function as a check valve, so there is a problem that the risk of malfunctioning at the time of opening the valve is doubled.

However, as described in the aforementioned embodiment, when it is configured such that the pin 64 is inserted between the balls 52 and 56 which are the valve body and the ball 56 is actively raised together with the ball 52 when the operating portion 60 is raised, it is possible to enhance the reliability when opening the valve while improving the reliability when closing the valve by making the opening and closing mechanism of the valve in a two-stage configuration.

In this embodiment, the structure of the outlet side check valve 36 is similar to that of the inlet side check valve 32, but the inlet side check valve 32 and the outlet side check valve 36 are not necessarily configured as described above, and only one of them may have the aforementioned configuration.

DESCRIPTION OF REFERENCE SYMBOLS 2a, 2b liquid delivery pump
4a, 4b pump head
6a, 6b pump body
8a, 8b pump chamber
10a, 10b plunger
12a, 12b crosshead
14a, 14b cam follower
16a, 16b elastic member
18a, 18b cam
20 stepping motor
22 drive shaft
30 flow passage (liquid inlet flow passage)
32 inlet side check valve
34 flow passage (liquid outlet flow passage)
36 outlet side check valve
42 valve body
44 housing
46 liquid inlet
47 liquid outlet
48 cylinder section
49 gasket
50 ball seat (first valve seat)
52 ball (first valve body)
53 spacer
54 ball seat (second valve seat)
56 ball (second valve body)
58 permanent magnet 60 operating portion
62 pin (first drive body)
64 pin (second drive body)
66 weight
68 elastic member
70 mechanism
72 iron core
74 coil

The invention claimed is:

1. A check valve comprising:
a rectilinear flow passage having a liquid inlet that allows a liquid to flow in and a liquid outlet that allows a liquid to flow out and configured to flow a liquid in one direction;
a first valve body arranged in the rectilinear flow passage so as to be movable in the one direction;
a first valve seat arranged between the liquid inlet and the first valve body, having a flow passage forming a part of the rectilinear flow passage on an inner side, and configured to seat the first valve body so as to close a liquid outlet side opening of the flow passage;
a second valve body arranged between the liquid outlet and the first valve body in the rectilinear flow passage so as to be movable in the one direction
a second valve seat arranged between the first valve body and the second valve body, having a flow passage forming a part of the rectilinear flow passage on an inner side, and configured to seat the second valve body so as to close a liquid outlet side opening of the flow passage;
a first drive body arranged in the rectilinear flow passage at a position closer to the liquid inlet than the first valve body so as to be movable in the one direction;
a drive mechanism arranged to set the first drive body either to an open state in which the first drive body presses the first valve body toward the liquid outlet to detach the first valve body from the first valve seat or to a closure state in which the first drive body does not press the first valve body toward the liquid outlet but allows the first valve body to be seated on the first valve seat; and
a second drive body arranged in the rectilinear flow passage between the first valve body and the second valve body so as to be movable in the one direction and configured such that when the first drive body is set to the open state, the second drive body is pressed by the first valve body toward the liquid outlet to press the second valve body toward the liquid outlet, thereby detaching the second valve body from the second valve seat, and when the first drive body is set to the closure state, the second drive body is moved away from the second valve body to allow the second valve body to be seated on the second valve seat.

2. The check valve as recited in claim 1, wherein
the second drive body is a pin shorter than a distance between the first valve body seated on the first valve seat and the second valve body seated on the second valve seat.

3. The check valve as recited in claim 2, wherein
the second drive body is supported by the second valve seat so as to maintain a state in which its axial direction extends in the one direction.

4. The check valve as recited in claim 3, wherein
an inner flow passage of the second valve seat has a circular cross-sectional shape in a direction perpendicular to a flow direction, and
a cross-sectional shape of the second drive body has a circular shape having an outer diameter approximately the same as an inner diameter of the inner flow passage of the second valve seat and a recessed portion in a direction perpendicular to the axial direction.

5. The check valve as recited in claim 3, wherein
the second drive body is composed of the same material as the second valve seat.

6. The check valve as recited in claim 1, wherein
the first valve body and the second valve body are composed of members of the same shape and made of the same material, and
the first valve seat and the second valve seat are composed of members of the same shape and made of the same material.

7. The check valve as recited in claim 1, further comprising:
a pressing member configured to press the second valve body from the liquid outlet side to the liquid inlet side.

8. A liquid delivery pump comprising:
a pump chamber;
a liquid inlet flow passage that allows a liquid to flow into the pump chamber;
a liquid outlet flow passage that allows a liquid to flow out of the pump chamber;
a plunger having a tip end inserted into the pump chamber;
a plunger drive mechanism configured to drive the plunger in its axial direction;
an inlet side check valve provided in the liquid inlet flow passage to prevent a backward flow of a liquid in the liquid inlet flow passage when a liquid is discharged from the pump chamber; and
an outlet side check valve provided in the liquid inlet flow passage to prevent a backward flow of a liquid in the liquid outlet flow passage when a liquid is sucked to the pump chamber,
wherein at least one of the inlet side check valve and the outlet side check valve is the check valve as recited in claim 1.

* * * * *